United States Patent
Hein et al.

(10) Patent No.: US 8,400,327 B2
(45) Date of Patent: Mar. 19, 2013

(54) METHOD FOR QUERYING A MEASUREMENT VALUE

(75) Inventors: Gerd Hein, Herzogenaurach (DE);
Georg Kuderewski, Forchheim (DE);
Thorsten Niemann, Röttenbach (DE);
Egid Schneider, Weisendorf (DE)

(73) Assignee: Siemens Aktiengesellschaft, Munich (DE)

( * ) Notice: Subject to any disclaimer, the term of this patent is extended or adjusted under 35 U.S.C. 154(b) by 622 days.

(21) Appl. No.: 12/449,966

(22) PCT Filed: Jan. 30, 2008

(86) PCT No.: PCT/EP2008/051100
§ 371 (c)(1),
(2), (4) Date: Oct. 27, 2009

(87) PCT Pub. No.: WO2008/107235
PCT Pub. Date: Sep. 12, 2008

(65) Prior Publication Data
US 2010/0058829 A1     Mar. 11, 2010

(30) Foreign Application Priority Data
Mar. 6, 2007   (DE) .................. 10 2007 011 232

(51) Int. Cl.
*G08C 19/22* (2006.01)
(52) U.S. Cl. .................. 340/870.07; 340/942
(58) Field of Classification Search ............. 340/870.07, 340/942
See application file for complete search history.

(56) References Cited

U.S. PATENT DOCUMENTS

| | | | |
|---|---|---|---|
| 6,505,103 B1 * | 1/2003 | Howell et al. .................. 701/19 |
| 6,806,808 B1 | 10/2004 | Watters et al. | |
| 6,924,648 B2 | 8/2005 | Altmann et al. | |
| 7,034,660 B2 | 4/2006 | Watters et al. | |

(Continued)

FOREIGN PATENT DOCUMENTS

| DE | 102 36 943 | 3/2004 |
|---|---|---|
| DE | 10239303 A1 | 3/2004 |

(Continued)

OTHER PUBLICATIONS

Notification of Reasons for Refusal for corresponding Japanese patent application No. 2009-552142 dated Aug. 7, 2012 with English translation.

(Continued)

*Primary Examiner* — Jean B Jeanglaude
(74) *Attorney, Agent, or Firm* — Harness, Dickey & Pierce, P.L.C.

(57) ABSTRACT

A method for querying a measurement value, wherein the measurement value is converted into a modulation signal that influences the reflective properties of a sensor antenna. A signal is emitted via a query device, wherein the signal is returned in an altered fashion by the sensor antenna and then received again by the query device. The measurement value is determined from the altered signal received. According to at least one embodiment of the invention, a plurality of measurement values are detected by sensors and the query device is moved past a plurality of sensor antennas in a vehicle or by a person. Thus, a plurality of sensors detect measurement values on a railroad line, for example. The vehicle is, for example, a rail vehicle traveling on the track of the railroad line.

8 Claims, 1 Drawing Sheet

U.S. PATENT DOCUMENTS

| | | | |
|---|---|---|---|
| 7,103,460 B1 * | 9/2006 | Breed | 701/32.9 |
| 2002/0154029 A1 | 10/2002 | Watters et al. | |
| 2004/0061628 A1 * | 4/2004 | Hill et al. | 340/942 |
| 2004/0104723 A1 | 6/2004 | Altmann et al. | |
| 2006/0025897 A1 * | 2/2006 | Shostak et al. | 701/1 |
| 2006/0164248 A1 | 7/2006 | Vossiek | |

FOREIGN PATENT DOCUMENTS

| | | |
|---|---|---|
| DE | 102005034102 A1 | 2/2007 |
| DE | 10 2007 009 545 | 8/2008 |
| EP | 0 720 539 | 3/1997 |
| JP | 8054435 A | 2/1996 |
| JP | 9-251035 | 9/1997 |
| JP | 2001-097079 | 4/2001 |
| JP | 2002-538519 | 11/2002 |
| JP | 2005-523494 | 8/2005 |
| JP | 2006-177765 | 7/2006 |
| JP | 2006-258494 | 9/2006 |
| RU | 2143359 C1 | 12/1999 |
| RU | 2242392 C2 | 12/2004 |
| RU | 48911 U1 | 11/2005 |
| WO | WO 03/085360 | 10/2003 |

OTHER PUBLICATIONS

Notification of Reasons for Refusal for corresponding Japanese patent application No. 2009-552142 dated Nov. 27, 2012 with English translation.

* cited by examiner

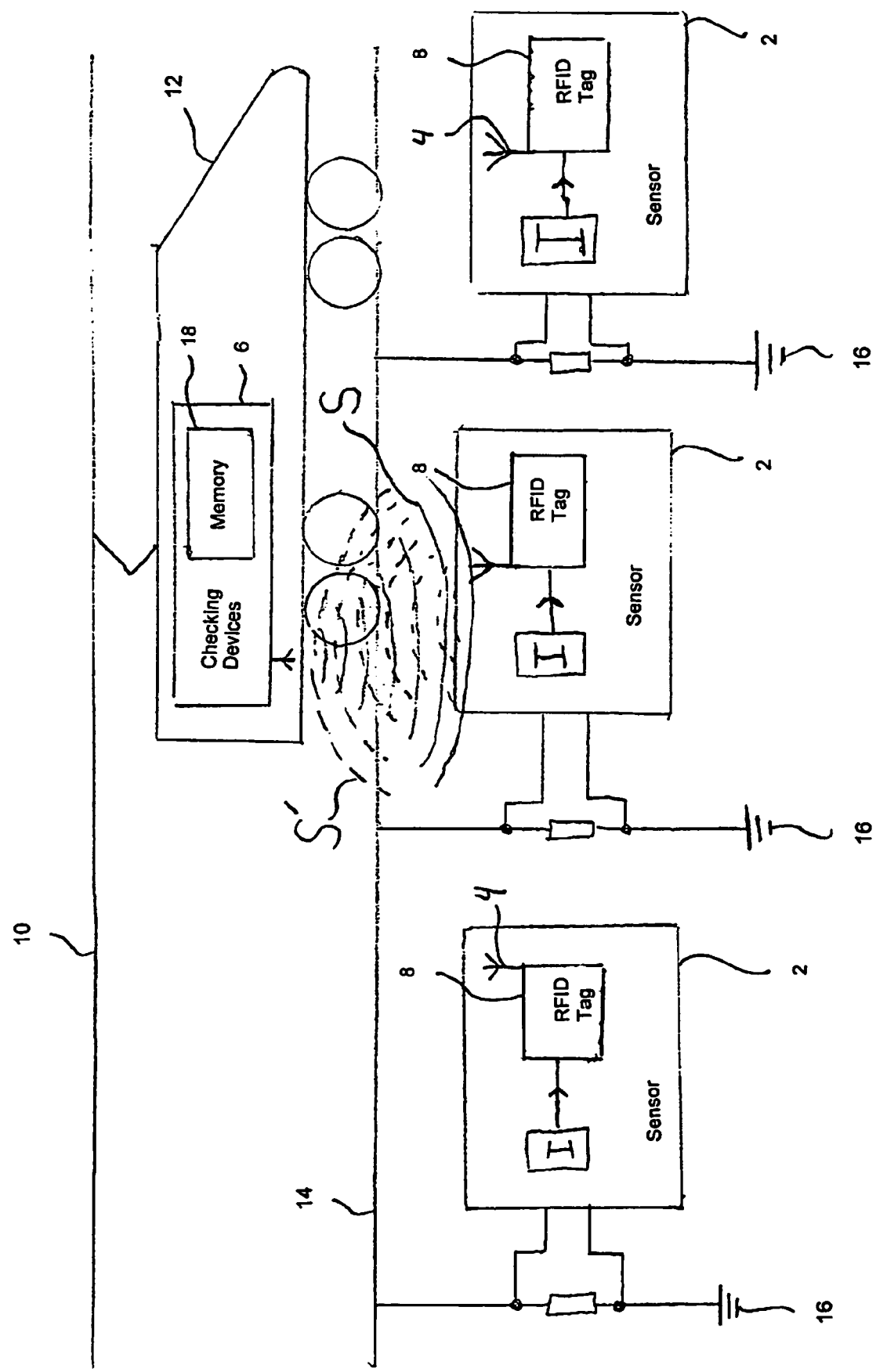

METHOD FOR QUERYING A MEASUREMENT VALUE

PRIORITY STATEMENT

This application is the national phase under 35 U.S.C. §371 of PCT International Application No. PCT/EP2008/051100 which has an International filing date of Jan. 30, 2008, which designated the United States of America and which claimed priority on German application no. DE 10 2007 011 232.9 filed Mar. 6, 2007, the entire contents of which are hereby incorporated herein by reference.

FIELD

At least one embodiment of the invention generally relates to a method for checking a measured value, with the measured value being converted to a modulation signal which influences the reflection characteristic of a sensor antenna, with a signal being transmitted by way of a checking device, which signal is sent back with a change by the sensor antenna and is received again by way of the checking device, and with the measured value being determined from the received changed signal.

BACKGROUND

A method is known for example from the Patent Application 10 2007 009 545.9 (2007P03983 DE) submitted to the German Patent and Trademark Office, is referred to as a modified backscatter technique. Until now, this technique has been used only for relatively small areas.

DE 102 36 943 B4 and, in a similar manner, EP 0 720 539 B1 disclose methods which are used to identify dangers caused by scatter currents which can occur on the track installations of direct-current railroads. In the process, for example, faults on voltage flashover protection devices are identified.

Normally the rails are used as the electrical return path for direct-current railroads. The rails are therefore insulated from ground, that is to say from the ground. Specifically, the aim is that no current should flow from the rails through the ground into surrounding conductive structures. Structures such as these may be parts of building foundations or tunnel installations, or else pipeline systems. When structures such as these are composed of metal, the current flow can lead to corrosion. The insulation between the rails and the ground may, however, become damaged over the course of time or may be electrically bridged in some other way, as a result of which scatter currents can enter the ground and the structures that are endangered.

In order to allow such scatter currents to be identified, a plurality of measurement points for electrical voltages between the rail and the ground are arranged along the railroad line, according to DE 102 36 943 B4. The measured values measured there must then be transmitted to an evaluation center. In addition, according to EP 0 720 539 B1, potential differences are measured between the rail and the ground, and these measured values are then transmitted to a control center. Normal radio signals are used for this purpose.

SUMMARY

At least one embodiment of the invention is directed to checking a measured value using a modified backscatter technique, such that measured values which occur distributed physically over a long distance can be identified quickly and reliably, with the aim of still retaining the advantage of the backscatter technique that only a small power supply device is required at the point at which measurements are carried out.

BRIEF DESCRIPTION OF THE DRAWING

FIG. 1 is a schematic representation of an example embodiment of a system of use of the subject matter of the present invention.

DETAILED DESCRIPTION OF THE EXAMPLE EMBODIMENTS

According to an embodiment of to the invention, a plurality of measured values from sensors are detected, and the checking device is moved, in a vehicle or by a person, past a plurality of sensor antennas.

The method for checking a measured value (I) uses a plurality of sensors (2) having sensor antennas (4) to detect a plurality of measured values (I) of checking devices (6). The identity of a sensor antenna (4) is recognized by means of an RFID tag (8) connected to it. The checking devices (6) are part of a power supply installation (10) of the railroad line. Each of the checking devices (6) is located in a rail vehicle (12) which moves along a track (14) of the railroad line. The sensors (2) detect electric current (I) from the track (14) of a direct-current railroad to the ground (16). The measured value (I) is converted to a modulation signal which influences a reflection characteristic of the sensor antenna (4). A signal (S) is transmitted by a checking device (6) moving past the sensor antenna (4). The signal (S) is received by the sensor antenna (4) which in turn reflects a changed signal (S') according to the influence of the modulation signal. The changed signal (S') is again received by the checking device (6) from which the measured value (I) is determined. The checking device (6) is connected to a memory (18) for storing and later reading out of the received changed signals (S').

The sensors 2 may in this case detect any desired physical variable. The measured values I from numerous sensors 2 can then be checked quickly by the positioning of the checking device 6 in a vehicle 12. If the distance over which the sensors 2 are distributed is not excessive, a person can also carry the checking device 6, instead of fitting it on the vehicle 12.

For example, a plurality of sensors 2 detect measured values on devices which are located on a railroad line. In the case of a linear arrangement of the sensors 2 such as this, it is particularly advantageous to use a vehicle 12 to check the measured values I. By way of example, the devices are part of the power supply installation 10 of the railroad line. This may be an overhead line installation or, in particular, a known power supply installation for a direct-current railroad.

By way of example, the sensors 2 detect the electric current I from the track installation 14 of a direct-current railroad to the ground 16.

The sensors 2 monitor, for example, voltage flashover protection devices which are located between the track installation 14 and the ground 16.

The modified backscatter technique can advantageously be used particularly well for identification of dangers caused by scatter currents on direct-current railroads.

According to another example, the sensors 2 detect the wear of an overhead wire 10. In this case as well, a large number of sensors 2 are distributed over a long distance, which means that it is advantageous to use a vehicle 12 to detect the signals S.

By way of example, the checking device 6 is located in a vehicle 12 which moves along the railroad line 14.

By way of example, this vehicle 12 is a rail vehicle which moves on the track 14 of the railroad line. This achieves the particular advantage that the movement of the checking device 6, as required according to the modified backscatter technique, along the sensors 2 takes place on that railroad line 14 which is being monitored by the sensors 2. In this case, supply of electrical power of the checking device 6 is always ensured via the railroad locomotive.

According to another example, the vehicle is a road vehicle. This vehicle can move along numerous sensors without a rail vehicle impeding the other train traffic on the railroad line.

However, it is also possible for the checking device to be accommodated in a conventional scheduled train. For example, the checking device 6 is connected to a memory 18 for storage and subsequent reading of the received changed signals S'. This achieves the advantage that the received changed signals S' need not be evaluated in the vehicle 12 and also need not be transmitted from the vehicle via a radio link to a control center. For example, the reading process can be carried out at a train station, if the vehicle 12 is a rail vehicle. The reading process can also be carried out at any desired central station.

For example, the identity of a sensor antenna 4 is identified by an RFID tag 8 connected to it. This achieves the particular advantage that it is possible to accurately determine the location where the measured value I was detected. This is particularly important when, for example, the aim is to identify scatter currents on a railroad line 14 for direct-current railroads. A defect can then not only be identified, but can also be located exactly. Required repair measures on the insulation can then be carried out quickly.

In particular, the method for checking a measured value according to at least one embodiment of the invention achieves the advantage that sensors which are distributed over a long distance can be checked very quickly by means of the modified backscatter technique. Use on a railroad line is particularly advantageous, in particular in this case to identify dangers caused by scatter currents which can occur on direct-current railroad installations.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A method for checking a measured value, the measured value being converted to a modulation signal which influences a reflection characteristic of a sensor antenna, a signal being transmitted by a checking device, the signal being sent back with a change by the sensor antenna and the signal again being received by way of the checking device, the measured value being determined from the received changed signal, wherein a plurality of measured values are detectable by sensors and the checking device being movable past a plurality of sensor antennas, the method comprising:

using a plurality of sensor antennas to detect a plurality of measured values of checking devices, located on a railroad line, which are part of a power supply installation of the railroad line, the checking devices each being located in a rail vehicle which moves along a track of the railroad line, wherein the sensors detect electric current from the track installation of a direct-current railroad to the ground.

2. The method of claim 1, further comprising monitoring the operational capability of electrical insulation between rails and the ground of the railroad line.

3. The method as claimed in claim 1, wherein the sensors monitor voltage flashover protection devices located between the track installation and the ground.

4. The method as claimed in claim 1, wherein the sensors detect the wear of an overhead wire.

5. The method as claimed in claim 4, wherein an identity of a sensor antenna is identified by an RFID tag connected to the sensor antenna.

6. The method as claimed in claim 1, wherein an identity of a sensor antenna is identified by an RFID tag connected to the sensor antenna.

7. The method as claimed in claim 1, wherein the checking device is connected to a memory for storage and subsequent reading of the received changed signals.

8. The method as claimed in claim 7, wherein an identity of a sensor antenna is identified by an RFID tag connected to the sensor antenna.

* * * * *